UNITED STATES PATENT OFFICE.

GUY JAMES STOCK, OF BRADFORD, ENGLAND, ASSIGNOR TO HAROLD H. BLACKBURN, OF BRADFORD, ENGLAND.

MANUFACTURE OF IRON.

1,333,824.     Specification of Letters Patent.     Patented Mar. 16, 1920.

No Drawing.     Application filed October 11, 1917. Serial No. 195,943.

*To all whom it may concern:*

Be it known that I, GUY JAMES STOCK, a subject of the King of Great Britain, residing at Canal Road, Bradford, in the county of York, England, have invented certain new and useful Improvements in or Relating to the Manufacture of Iron, of which the following is a specification.

This invention relates to a synthetic method of producing gray iron (as distinct from steel), suitable for casting, from waste steel in the form of steel turnings or steel scrap.

In the present method the charge is melted in an electric furnace with the addition of sufficient powdered carbon to give the required carbon content in the resulting iron and when the charge is thoroughly melted (the iron being then in the condition of white iron) the silicon is added until the desired proportion is attained. If sufficient silicon is added this results in the precipitation of a substantial part of the carbon as graphite producing a gray iron of high tensile strength.

For example, to a charge of 1000 lbs. of steel about 50 lbs. of carbon may be added and, after melting, such a proportion of silicon, manganese and other minor ingredients is added to the molten mass as is found desirable for the class of iron required. Such proportion and ingredients are known by manufacturers for the different classes of iron and may vary considerably. As a specific example the following proportions may be given:— Steel 1000 lbs., carbon 50 lbs., 50 per cent. ferro-silicon 40 lbs., resulting in a gray iron containing about 3 per cent. carbon and 2 per cent. silicon. Or, if carborundum is employed:— Steel 1000 lbs., carbon 40 lbs., carborundum 40 lbs.; resulting in a gray iron containing about 4 per cent. carbon and 2 per cent. silicon. It has been found possible in practice, however, to make iron with as much as 5½ per cent. of carbon and 5½ per cent. of silicon. The furnace used is preferably lined with silica.

The iron made by this method is found to possess a very close grain and high tensile strength as compared with ordinary cast iron and it is possible to produce with regularity gray cast iron having a tensile strength of 17 to 20 tons per square inch, and a transverse strain of 38 to 43 cwt. with a deflection of about 0.2″ in a bar of one inch square broken on 12″ centers.

What I claim and desire to secure by Letters Patent of the United States is:

1. A method of producing gray iron which consists in melting in a furnace a charge of scrap with the addition of carbon to produce a white iron, and subsequently adding to the melted charge of white iron a suitable proportion of silicon to precipitate part of the carbon.

2. A method of producing gray iron which consists in melting in an electric furnace a charge of scrap with the addition of carbon to produce a white iron, and subsequently adding to the melted charge of white iron, in the said furnace, a suitable proportion of silicon to precipitate part of the carbon.

3. A method of producing a gray iron which consists in melting in a furnace a charge of scrap with the addition of carbon to produce a white iron, and subsequently adding to the melted charge of white iron a suitable proportion of ferro-silicon to precipitate part of the carbon.

4. A method of producing a gray iron which consists in melting in a furnace a charge of scrap with the addition of about 5 per cent. carbon to produce a white iron, and subsequently adding to the melted charge of white iron about 4 per cent. ferro-silicon to precipitate part of the carbon.

GUY JAMES STOCK.